United States Patent
Bech

(10) Patent No.: US 9,115,695 B2
(45) Date of Patent: Aug. 25, 2015

(54) METHOD AND ARRANGEMENT FOR CONTROLLING A WIND TURBINE

(71) Applicant: John Bech, Hammel (DK)

(72) Inventor: John Bech, Hammel (DK)

(73) Assignee: Siemens Aktiengesellschaft, Munich (DE)

( * ) Notice: Subject to any disclaimer, the term of this patent is extended or adjusted under 35 U.S.C. 154(b) by 128 days.

(21) Appl. No.: 13/942,955

(22) Filed: Jul. 16, 2013

(65) Prior Publication Data

US 2015/0021912 A1 Jan. 22, 2015

(51) Int. Cl.
*F03D 7/02* (2006.01)

(52) U.S. Cl.
CPC ............ *F03D 7/0276* (2013.01); *F03D 7/0284* (2013.01); *F05B 2270/1016* (2013.01); *F05B 2270/1033* (2013.01); *F05B 2270/337* (2013.01)

(58) Field of Classification Search
CPC ...................................................... Y02E 10/723
USPC ...................................................... 290/44, 55
See application file for complete search history.

(56) References Cited

U.S. PATENT DOCUMENTS

| | | | | |
|---|---|---|---|---|
| 4,994,684 A * | 2/1991 | Lauw et al. | .................. | 290/52 |
| 2010/0286835 A1* | 11/2010 | Nyborg et al. | .................. | 700/287 |
| 2011/0031748 A1* | 2/2011 | Arinaga et al. | .................. | 290/44 |
| 2012/0076651 A1* | 3/2012 | Laurberg | .................. | 416/1 |
| 2012/0161444 A1* | 6/2012 | Tarnowski | .................. | 290/44 |
| 2012/0300510 A1* | 11/2012 | Jensen et al. | .................. | 363/35 |
| 2014/0042745 A1* | 2/2014 | Perley et al. | .................. | 290/44 |
| 2014/0054893 A1* | 2/2014 | Lindholdt et al. | .................. | 290/44 |
| 2014/0167416 A1* | 6/2014 | Perley et al. | .................. | 290/44 |

FOREIGN PATENT DOCUMENTS

| | | |
|---|---|---|
| EP | 2270332 A1 | 1/2011 |
| WO | 2010000648 A2 | 1/2010 |
| WO | 2011000531 A1 | 1/2011 |

OTHER PUBLICATIONS

Van Der Hooft E. et al; "Wind turbine control algorithms"; ECN Literature Review; vol. ECN-C-03-111; pp. 1-89; XP003008410.

Prillwitz F. et al; "Primärregelung mit Windkraftanlagen"; ETG_Workshop neue Denzentrale Versungsstrukturen, Feb. 19-20, 2003 Frankfurt; pp. 1-6; URL: www.e-technik.uni-rostock.de/ee/download/publications_EEV/uni_hro_publ133_etg_frankfurt_2003.pdf; XP002473463.

* cited by examiner

*Primary Examiner* — Tulsidas C Patel
*Assistant Examiner* — Sean Gugger

(57) ABSTRACT

It is described a method and an arrangement for controlling a wind turbine (811) having a rotor (813) and being connected to a utility grid (831), the method comprising: increasing a rotational speed (205) of the rotor from a typical rotational speed (209, 505) to an increased rotational speed (211, 507).

3 Claims, 4 Drawing Sheets

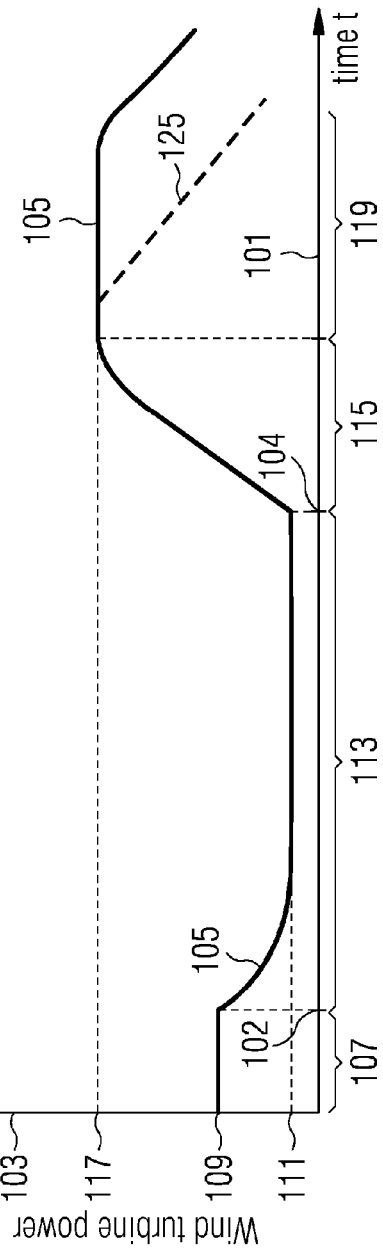
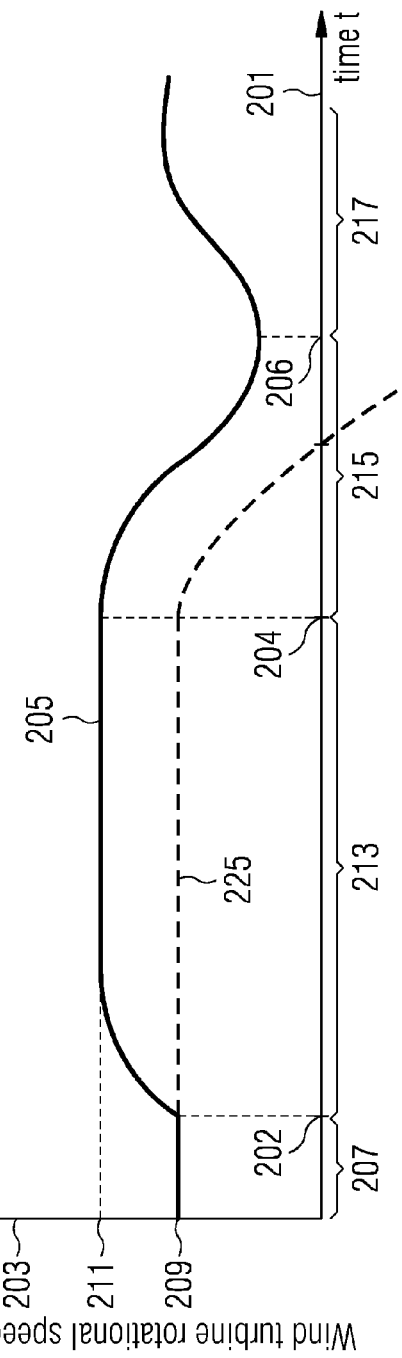

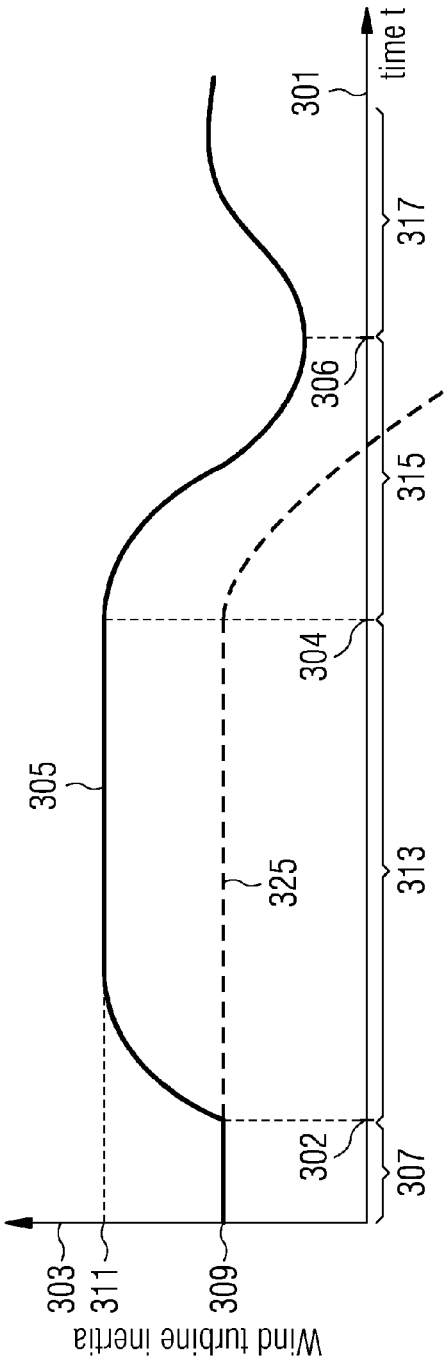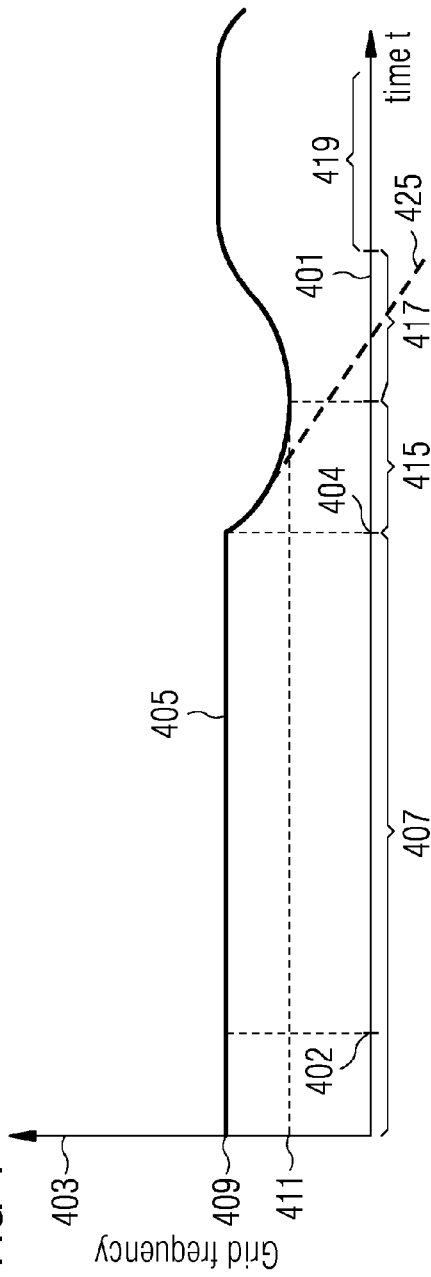

METHOD AND ARRANGEMENT FOR CONTROLLING A WIND TURBINE

FIELD OF INVENTION

The present invention relates to a method and to an arrangement for controlling a wind turbine, in particular for improving a stability of a utility grid to which the wind turbine is connected.

ART BACKGROUND

One or more wind turbines may form a wind park which is connected to a utility grid which may provide electrical energy to plural consumers. Electrical power needed by the consumers may not in all situations balance electrical power produced by the wind turbines. In particular, if a large load is connected or switched on to the utility grid, a decrease of the frequency of the grid may be expected. In this case, the wind turbines may give only a limited inertia response, in order to support or stabilize the frequency. In other situations, the electrical power produced by the wind turbines may be larger than the power consumed by the consumers, in which case curtailment of the power from the wind turbines may be required. Thereby, in a conventional method and system, the power curtailment may be achieved by pitching out the rotor blades of the wind turbines. By pitching out the rotor blades, the efficiency of energy transfer from the wind to the rotor to which the rotor blades are connected may be decreased, resulting in a decrease of power output by the wind turbines.

The document EP 2 532 888 A1 discloses an arrangement for generating a control signal for controlling a power output of a power generation system, in particular a wind turbine, wherein a first input signal indicative of an actual grid frequency of the utility grid is received and wherein a control circuit generates a control signal and wherein the control circuit comprises a bang-bang which is activated when the first input signal falls below a first predetermined threshold. The above-mentioned document proposes a power boost function, wherein power output is increased.

It has been observed that stability of the utility grid may not be ensured in a sufficient manner in all conditions of wind speed, demand at the utility grid and operating conditions of the wind turbine.

There may be a need for a method and arrangement for controlling a wind turbine which may improve the stability of the utility grid, in particular in situations where the utility grid requires more power, in particular a sudden increase of power.

SUMMARY OF THE INVENTION

This need may be met by the subject matter according to the independent claims. Advantageous embodiments of the present invention are described by the dependent claims.

According to an embodiment of the present invention, it is provided a method for controlling a wind turbine having a rotor and being connected to a utility grid, the method comprising increasing a rotational speed of the rotor from a typical, in particular nominal, rotational speed to an increased rotational speed.

The wind turbine may comprise a wind turbine tower, a nacelle attached at a top of the wind turbine tower such that it is rotatable around a vertical axis, wherein the nacelle may comprise a rotor rotatably supported within the nacelle, wherein at the rotor one or more rotor blades may be connected. The rotor may be driving, upon rotation of the rotor, a generator which may output a variable frequency power stream. The variable frequency power stream may be supplied to a converter, in particular an AC-DC-AC converter which may comprise plural controllable switches and which may output a fixed frequency power stream which may substantially have a predetermined frequency as demanded by a grid operator of the utility grid.

The control method may be performed by a wind park transformer and/or by (an) individual wind turbine controller(s). The rotational speed of the rotor may also be expressed as an angular velocity of the rotor. Wind may impact onto one or more rotor blades connected to the rotor, causing the rotor to rotate. The rotor rotational speed may increase with increasing wind speed. In particular, the rotational speed may increase in a linear manner from zero at no wind speed to the increased rotational speed at a first wind speed value, in particular between 10 and 15 m/s. For increasing wind speed, the rotational speed of the rotor may be kept constant at the increased rotational speed, at least for the case that no additional power output is required from the wind turbine.

Increasing the rotational speed of the rotor may involve controlling one or more components of the wind turbine, such as for example a converter, a generator or other components, in particular of a drive train, of the wind turbine. The increase of the rotational speed from the nominal rotational speed to the increased rotational speed may be for example in a linear manner within a predetermined time interval or according to a curved line within the predetermined time interval. The curved line may in particular be a convex curve.

By increasing the rotational speed to the increased rotational speed, additional kinetic energy may be stored within the rotor which may then, in case additional power output is required from the wind turbine, be utilized to actually provide the additional power output, involving simultaneously decreasing the rotational speed of the rotor. Thereby, the stability of the grid may be improved.

Furthermore, less blackouts of the complete power system including the electrical grid and the wind park may be observed. Furthermore, it may be enabled to connect larger loads to the utility grid, since the additional kinetic energy may be used to supply power to these loads. Furthermore, a larger penetration of wind turbines may be enabled. Additionally, embodiments of the present invention may improve to damp power system oscillations, since the additional kinetic energy may be utilized as a damping power. Furthermore, the power system may be supported with ancillary services (for example fast frequency-controlled disturbance reserve).

According to an embodiment of the present invention, the increasing the rotational speed is performed in case power output of the wind turbine should be decreased, wherein in particular the increasing the rotational speed is performed in a wind speed range at least from 0 m/s to 40 m/s, in particular from 12 m/s to 25 m/s and/or from 0 m/s to 12 m/s.

This situation may for example occur, if the wind speed has increased and/or if a power demand by the utility grid is decreased. In this situation, without changing the operation of the wind turbine, the wind turbine would output more power than needed by the utility grid. Thereby, overvoltages or overfrequencies may occur which may hamper the smooth and reliable operation of the wind turbine park and/or utility grid. In particular, system oscillations may be excited which may damage electronic and/or mechanical components of the wind turbine or the utility grid or one or more transmission systems. In such cases, advantageously more kinetic energy may be stored within the rotor of the wind turbine by increasing the rotational speed of the rotor without negatively affecting the reliable provision of electric energy.

In a conventional system, however, curtailment of power output may have been performed by pitching out the blades, i.e. rotating the rotor blades around a longitudinal axis of the rotor blades such as to reduce an efficiency of energy transfer from the wind to the rotor. In particular, these conventional systems did not increase the rotational speed and the kinetic energy of the rotor in the case that power output of the wind turbine should be decreased.

Power output of the wind turbine may for example be decreased in case where the wind speed increases and/or where an energy or power demand of the utility grid decreases.

According to an embodiment of the present invention, the method further comprises keeping a blade pitch angle of a blade connected to the rotor at least approximately constant, in particular within ±10% (of a previously adjusted value of the blade pitch angle), while increasing the rotational speed and/or while operating at the increased speed, thereby decreasing the efficiency of the transfer of energy from the wind to the rotor. The blade pitch angle may define an orientation of the blade with respect to a possible rotation along a longitudinal axis of the blade. In particular, the blade pitch angle may have been adjusted to an optimized blade pitch angle for the current wind speed. When in this condition power output of the wind turbine should be decreased, the blade pitch angle may be kept at the optimized blade pitch angle for the given wind speed. However, when the rotational speed of the rotor has been increased according to embodiments of the present invention, the previously adjusted blade pitch angle may not be optimal anymore for the changed, i.e. the increased rotational speed, as the efficiency of the blade may change with the ratio of the tip speed and the wind speed. As the rotational speed has been adjusted to the increased rotational speed, also the tip speed has changed to an increased tip speed such that the ratio between the respective tip speed and the wind speed may have been increased. Thus, for the increased rotational speed, the blade may not be adjusted in its optimal orientation regarding efficiency, such that, as a result of increasing the rotational speed to the increased rotational speed, reduction of power output may also be due (in addition to storing wind energy as kinetic energy of the rotor) to a reduced efficiency of the wind turbine.

According to an embodiment of the present invention, the control method further comprises receiving information, in particular including measurement data and/or a command from a controller, indicating that curtailment of power output is required, in particular in a case where a wind park including the wind turbine is producing more power than needed by the utility grid.

The measurement data may include measurement data regarding a voltage, frequency, and/or current at an output terminal of the wind turbine and/or at a point of common coupling at which a plurality of wind turbines are connected, or measurement data relating to a measurement location even beyond the point of common coupling. The command from the controller may comprise a command from a wind turbine controller and/or a wind park controller. The command from the controller may for example depend on measurement data of voltage, frequency and/or current at one or more locations within the wind park and/or the utility grid and/or a transmission line between the wind park and the utility grid.

The information may be transmitted via electrical/optical signals in a wire-based and/or wireless manner.

According to an embodiment of the present invention, the increased rotational speed is between 1.1 and 1.4 times the nominal rotational speed. Thereby, a relatively large portion of additional kinetic energy may be stored within the rotor for effectively supporting a stability of the grid in case a sudden imbalance between power production and power consumption is occurring, in particular in a wind speed range (513, 519) at least from 0 m/s to 40 m/s, in particular from 12 m/s to 25 m/s and/or from 0 m/s to 12 m/s.

According to an embodiment of the present invention, the method further comprises outputting from the wind turbine power that is reduced, in particular by between 5% and 25%, compared to a typical, in particular nominal, power output of the wind turbine.

The power output from the wind turbine may be adjusted to balance power demanded by the consumers of the utility grid.

According to an embodiment of the present invention, the rotational speed of the rotor is kept constant (in particular at least approximately) at the increased speed for increasing wind speed, if no additional power output from the wind turbine is required. Thereby, the wind turbine may be prepared to provide additional power output (if needed) for different wind speeds which may still further improve the method, in particular regarding stability of the utility grid.

However, if additional power output of the wind turbine is required, the rotational speed of the rotor may be decreased for increasing power output of the wind turbine.

According to an embodiment of the present invention, the method further comprises, after having increased the rotational speed to the increased rotational speed: requiring increase of power output from the wind turbine and increasing a torque acting on the rotor, in order to increase power output of the wind turbine, in particular a generator of the wind turbine.

Requiring increase of the power output from the wind turbine may involve or result from decrease of a wind speed and/or increase of a power demand of consumers of the utility grid. Increasing the torque acting on the rotor may effectively reduce the rotational speed of the rotor, thereby extracting kinetic energy from the rotor which may then be converted to electrical energy or electrical power which may then be output by the generator and/or the converter of the wind turbine. For the additional power output, the portion of the stored electrical energy due to increasing the rotational speed to the increased rotational speed may be utilized.

According to an embodiment of the present invention, the method further comprises measuring a frequency of a voltage of the utility grid and determining that increase of power output from the wind turbine is required, if the measured frequency is below, in particular at least 0.1% below, a reference frequency of the grid.

The utility grid may have a reference frequency such as 50 Hz or 60 Hz. A measured frequency falling below the reference frequency may indicate that there is an imbalance between power demand at the utility grid and power production at the wind turbine or the wind turbine park. In particular, if the measured frequency falls below the reference frequency, more power may be required at the utility grid than is produced by the wind turbine(s) and/or the wind turbine park. In this situation, advantageously, the kinetic energy stored within the rotor may be utilized to satisfy the additional power demand. In order to extract the kinetic energy from the rotor, the torque may be increased, thereby converting some of the kinetic rotational energy into electric energy.

Measuring the frequency of the voltage and/or current of the utility grid may be performed at or close a point of common coupling, at or close of a wind turbine output terminal and/or beyond a location of the point of common coupling. A frequency thus measured may be a good indication whether there is an imbalance of power demand and power production. Thereby, the method may be simplified.

If the measured frequency is above, in particular at least 0.1% above, the reference frequency of the grid, this may indicate, that power output of the wind turbine should be decreased.

According to an embodiment of the present invention, the method further comprises adjusting the increased power output from the wind turbine such that the frequency of the grid stays at the reference frequency. Thereby, the stability of the grid may be improved.

In particular, the method according to each of the above or below described embodiments may be performed at one or more wind turbines in parallel. In particular, the method may be performed for all wind turbines in the wind park. Thereby, a considerable amount of power reserve may be achieved which may be supplied to the utility grid in cases where power demand of the utility grid is larger than the current power production of the wind turbines.

According to an embodiment of the present invention, the nominal speed is a speed the wind turbine is designed for continuous operation, in particular optimized regarding at least one of power output and electronic and/or mechanical wear of wind turbine components, in particular at least one of a bearing, a generator, a converter, a rotor blade.

According to an embodiment of the present invention, the increasing the rotational speed of the rotor involves sending a control signal to a converter which converts a power stream output by a generator coupled to the rotor, such as to reduce a torque generated by the generator and acting on the rotor, in particular between 5% and 30% compared to a torque corresponding to the typical, in particular nominal, rotational speed.

The control signal sent to the converter may comprise a reference voltage, reference power, reference active power, reference reactive power and/or reference power factor. The converter may comprise an AC-DC section, a DC link, and a DC-AC section. In each of the AC-DC section and the DC-AC section, the converter may comprise in particular six power transistors, such as IGBTs. The converter may further comprise a gate driver circuit which may, based on the control signal, determine or compute pulse width modulation signals which may be transmitted to gates of the power transistors. Upon receiving the pulse width modulation signal, the power transistors may open and close such as to produce a desired torque at the rotor and such as to output a power stream in accordance with the reference voltage, reference power, reference reactive power, reference active power and so on. Thereby, a conventional converter may be utilized.

According to an embodiment of the present invention, the rotational speed is maintained, if no additional power output from the wind turbine is required, at the increased rotational speed in a wind speed range at least from 12 m/s to 25 m/s and/or 0 m/s to 12 m/s, in particular from 12 m/s to 25 m/s and/or 0 m/s to 12 m/s.

Thereby, a reserve of available power or energy may be provided in different wind speed conditions, thereby extending the control method. Thereby, the stability of the utility grid may be improved in an extended wind speed range.

According to an embodiment of the invention, the increasing the rotational speed of the rotor involves increasing kinetic energy contained within the rotating rotor. The kinetic energy may depend on the rotational speed and a moment of inertia of the rotor including the rotor blades connected to the rotor.

It should be understood that features which have been individually or in any combination disclosed, described, explained or provided for a method for controlling a wind turbine may also be applied, individually or in any combination, to an arrangement for controlling a wind turbine according to an embodiment of the present invention and vice versa.

According to an embodiment of the present invention, it is provided an arrangement for controlling a wind turbine having a rotor and being connected to a utility grid, the arrangement comprising a processor for generating a control signal for transmission to a drive train of the wind turbine for increasing a rotational speed of the rotor from a typical, in particular nominal, rotational speed to an increased rotational speed.

The arrangement may be comprised within a wind turbine controller and/or a wind park controller.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

Embodiments of the present invention are now described with reference to the accompanying drawings. The invention is not restricted or limited to the explained or illustrated embodiments.

BRIEF DESCRIPTION OF THE DRAWINGS

FIG. 1 schematically illustrates a time course of an electrical power output by a wind turbine according to a conventional method and a control method according to an embodiment of the present invention;

FIG. 2 illustrates a time course of a rotational speed of a rotor of a wind turbine according to a conventional method and a control method according to an embodiment of the present invention;

FIG. 3 illustrates a time course of an inertia of a rotor in a conventional method and a control method according to an embodiment of the present invention;

FIG. 4 illustrates a time course of a grid frequency as observed in a conventional method and a control method according to an embodiment of the present invention;

DETAILED DESCRIPTION

Figure 5:
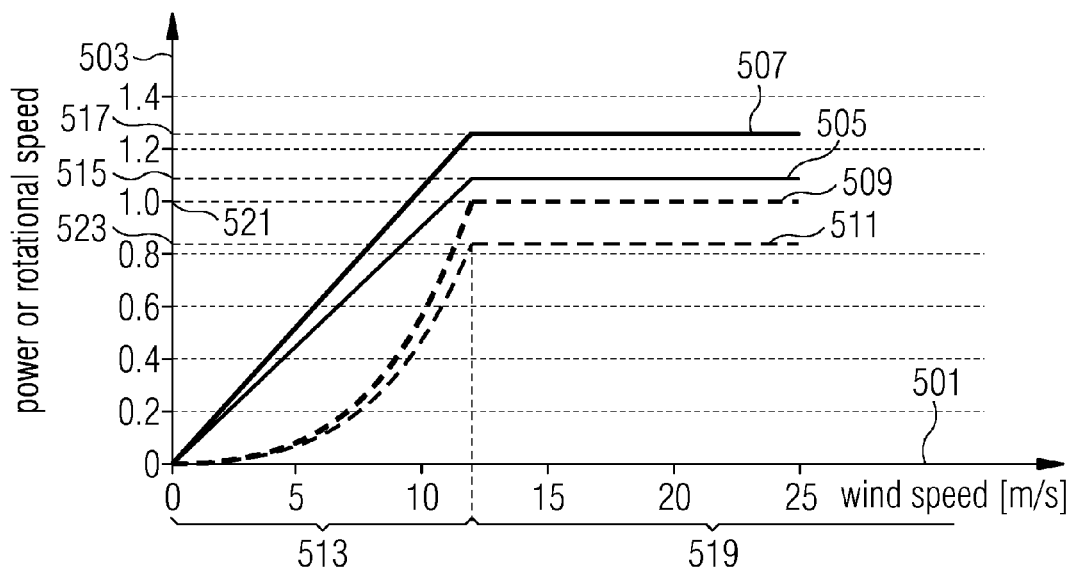
FIG. 5 illustrates power curves and rotational speed curves according to a conventional method and according to a control method according to an embodiment of the present invention in dependence of a wind speed.

The illustration in the drawings is in schematic form.

In the FIGS. 1 to 4, the abscissas 101, 201, 301 and 401 denote the time, 102 to 402, 104 to 404 denote particular time points. The ordinate 103 denotes a power output of the wind turbine (in FIG. 1), 203 denotes the rotational speed of a rotor of the wind turbine (in FIG. 2), 303 denotes the wind turbine inertia, i.e. the inertia of the rotor including the blades (FIG. 3) and 403 denotes the grid frequency (FIG. 4) in arbitrary units. The curves 105, 205, 305, 405 in FIGS. 1-4 thereby illustrate exemplary time courses of the respective electrical/mechanical quantities as achieved in a method for controlling a wind turbine according to an embodiment of the present invention. Thereby, events at a same horizontal position in the different figures occur at the same time.

The curve 105 in FIG. 1 indicates a power output of a wind turbine in the control method according to an embodiment of the present invention. In a time interval 107 from the time point 0 to the time point 102, the power output stays at a nominal power output 109. At the time point 102, the power output is reduced from the nominal power output 109 to a reduced power output 111 which is maintained within the time interval 113. At the time point 104, more power is demanded from a utility grid than is currently supplied by the wind turbine. Therefore, in a time interval 115 adjacent to the time point 104 (for example at which a large load is connected to the utility grid), the power output increases (almost in a linear manner) to reach at the end of the time interval 115 an increased power output 117. The increased power output 117 is maintained within the time interval 119 and is then subsequently being reduced, since the increased power demand may not be present anymore.

FIG. 2 illustrates as curve 205 the rotational speed of the rotor of a wind turbine which is controlled according to a control method according to an embodiment of the present invention. During the time interval 207 corresponding to the time interval 107 in FIG. 1, the rotational speed of the rotor stays at a nominal rotational speed, wherein the nominal rotational speed is indicated with reference sign 209. At the time point 202 corresponding to the time point 102 in FIG. 1, it is determined that the power output of the wind turbine should be decreased. Therefore, in order to store kinetic energy in the rotor, the rotational speed is increased from the nominal rotational speed 209 to an increased nominal speed 211. The increased rotational speed 211 is maintained within a time interval 213 to be above the nominal rotational speed 209. At the time point 204, where the power demand at the utility grid increases, for example where a large load is connected to the utility grid, the rotational speed slowly begins to decrease in a convex manner and even falling below the nominal rotational speed 209 at a time point 206. During the time interval 215, kinetic rotational energy stored within the rotor has been extracted and converted into electrical energy and has been output by the wind turbine, in order to satisfy the additional power demand. Beyond the time point 206, the rotational speed may then, in a time interval 217, increase to or beyond the nominal rotational speed 209.

The rotational speed in a control method according to an embodiment of the present invention is indicated with a curve 205 in dependence of the time.

FIG. 3 illustrates as curve 305 the inertia or the kinetic energy stored within the rotor of the wind turbine during a control method according to an embodiment of the present invention. In the time interval 307 corresponding to the time interval 207 in FIG. 2, the inertia stays at a nominal inertia 309. In the time interval 313 following the time point 302 corresponding to the time point 202 in FIG. 2, the inertia increases according to the curve 305 and stays then approximately constant at an increased inertia 311. At the time point 304, the inertia is still at the increased inertia 311 and during a time interval 315, the inertia slowly decreases even below the nominal inertia to reach a minimum value at a time point 306. After the time point 306, the inertia slowly increases within a time interval 317 following the time interval 315.

FIG. 4 illustrates in a curve 405 a time course of a grid frequency of a utility grid to which the wind turbine is connected according to an embodiment of the present invention. In a time interval 407 corresponding to the union of the time intervals 307, 313 in FIG. 3, the grid frequency stays at a reference frequency or nominal frequency 409. At the time point 404 corresponding to the time point 304 in FIG. 3, the grid frequency drops relatively sharply within a time interval 415 to a reduced grid frequency 411. However, the frequency does not decrease so dramatically that the stability of the grid is affected. Instead, within a time interval 417, the frequency recovers from the decreased frequency 411 to the nominal frequency 409 so that normal operation of the utility grid is ensured. Furthermore, in a time interval 419, the grid frequency stays substantially at the nominal grid frequency 409.

In FIGS. 1 to 4, the curves 125, 225, 325 and 425 denote respective time courses of the power output, the rotational speed, the inertia and the grid frequency as observed according to a conventional control method. For example, according to a conventional method, the power output 125 (see FIG. 1) decreases within the time interval 119, while the power output according to an embodiment of the present invention (curve 105 in FIG. 1) stays approximately constant in the time interval 119.

Further, as is illustrated in FIG. 2, the rotational speed 225 according to a conventional method stays at the nominal rotational speed 209 in the time interval 213, while the rotational speed 205 in this time interval is increased and is then maintained at an increased rotational speed 211.

Further, the inertia (or kinetic energy) 325 of the rotor (in FIG. 3) according to a conventional method stays in the time interval 313 at the nominal inertia 309, while according to the control method according to an embodiment of the present invention, the wind turbine inertia (see curve 305 in FIG. 3) is increased to and then maintained at an increased inertia 311.

Furthermore, according to a conventional method (see curve 425 in FIG. 4), the grid frequency keeps dropping after the increased power demand following the time point 404 much stronger and further than to the decreased grid frequency 411 so that a blackout cannot be excluded according to this conventional control method.

FIG. 5 illustrates, in dependence of a wind speed at an abscissa 501, a rotational speed according to a conventional method (see curve 505) and according to a control method according to an embodiment of the present invention (see curve 507), a power output according to a conventional method (see curve 509) and a power output according to a method according to an embodiment of the present invention (see curve 511). Thereby, the ordinate 503 denotes either the rotational speed or the power output in relative units (pu). Thus, for example, the nominal rotational speed may correspond to the vertical position at the label 1.0 or 1.1 and the nominal power output may also correspond to the vertical position at the label 1.0.

As can be taken from FIG. 5, in a wind speed range 513 reaching from about 0 m/s to 12 m/s, the rotational speed of the rotor according to the conventional method increases in a linear manner from 0 to a relative value of about 1.1 (reference sign 515), while the rotational speed according to the control method according to an embodiment of the present invention (see curve 507) increases from 0 to the increased rotational speed at about 1.3 as is labeled with reference sign 517. Thus, the increased rotational speed 517 is about 30% above the nominal rotational speed 515 which is attained in the conventional method.

In the subsequent time interval 519, the rotational speed 507 for the control method according to an embodiment of the present invention stays substantially at the increase rotational speed 517, thereby storing kinetic energy within the rotor.

Within the time interval 513, the power output according to the conventional method (see curve 509) increases from 0 to the nominal power output 521 and stays within the subsequent time interval 519 substantially at the nominal power output 521. In contrast, according to a control method according to an embodiment of the present invention, the power output (see curve 511) increases from 0 to a decreased (relative to the nominal value) power output as indicated with reference sign 523. Further, in the subsequent time interval 519, the power output according to the control method according to an embodiment of the present invention substantially stays at the decreased power output 523.

Figure 6:
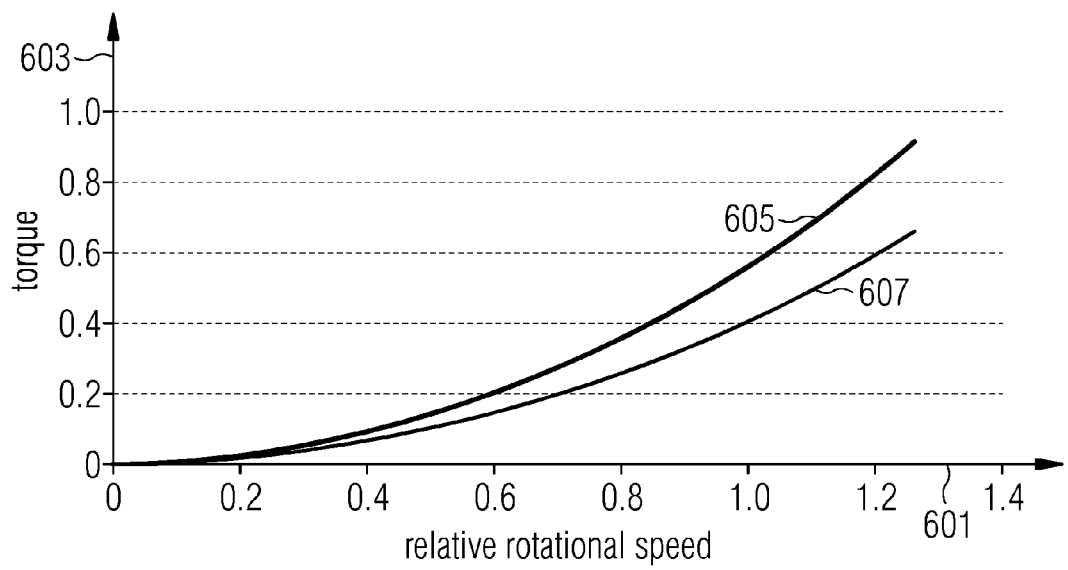
FIG. 6 illustrates a rotor torque according to a conventional method and according to a control method according to an embodiment of the present invention in dependency of a rotational speed of a rotor.

FIG. 6 illustrates graphs of a rotational speed at the abscissa 601 against a torque at the ordinate 603 according to a conventional method 605 and according to a control method according to an embodiment of the present invention (curve 607). As can be taken from FIG. 6, in which the rotational speed at the abscissa 601 is indicated in relative units which are related to the nominal rotational speed, the torque 607 applied within the control method according to an embodiment of the present invention is below the torque 605 according to a conventional method. Since the torque 607 according to the control method according to an embodiment of the present invention stays below the torque 605 according to the conventional method, the rotor will speed up to reach an increased rotational speed, such as a rotational speed 517 illustrated in FIG. 5 compared to the nominal rotational speed 515 reached in a conventional method.

Figure 7:
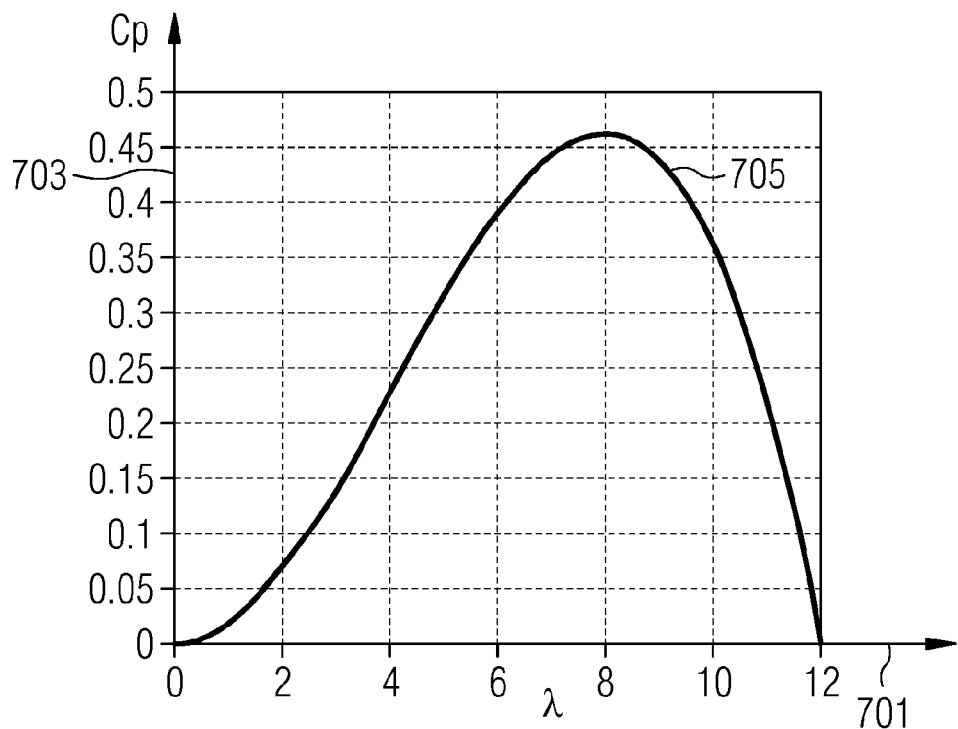
FIG. 7 illustrates an efficiency curve (Cp-curve) for a particular pitch angle of a rotor blade as may be used in a control method according to an embodiment of the present invention.

FIG. 7 illustrates on an abscissa 701 a ratio λ between a tip speed and a wind speed, wherein the tip speed is the speed of a tip of a rotor blade which is connected to the rotor of the wind turbine again. The ordinate 703 denotes an efficiency and the Cp-curve 705 shows the efficiency for a particular fixed pitch angle. As can be taken from the curve 705 referring to the efficiency of the blade, the efficiency increases from the ratio λ=tip speed/wind speed=0 to about λ=8 and decreases from λ=8 to λ=12. The curve 705 applies only to a particular pitch angle and may look different for a different pitch angle.

According to a conventional method, the efficiency of the rotor blade may be changed by changing the blade pitch angle, while in the method according to an embodiment of the present invention, the blade pitch angle may be kept constant. In particular, a conventional way to limit power output may be to change the pitch angle to a less efficient Cp-curve. According to an embodiment of the present invention, the rotational speed of the rotor is increased instead, while the pitch angle may be kept constant. If the efficiency is for example considered at the λ-value=8, it can be taken from FIG. 7 that Cp will decrease and also the power output would decrease for increasing λ from 8 to 9. Thus, also according to an embodiment of the present invention, since the rotational speed is increased, the power output could decrease due to a reduced efficiency Cp. However, stored kinetic energy is, compared to a conventional system, larger and may be advantageously used to provide additional power output if required, for example when the grid frequency drops.

Figure 8:
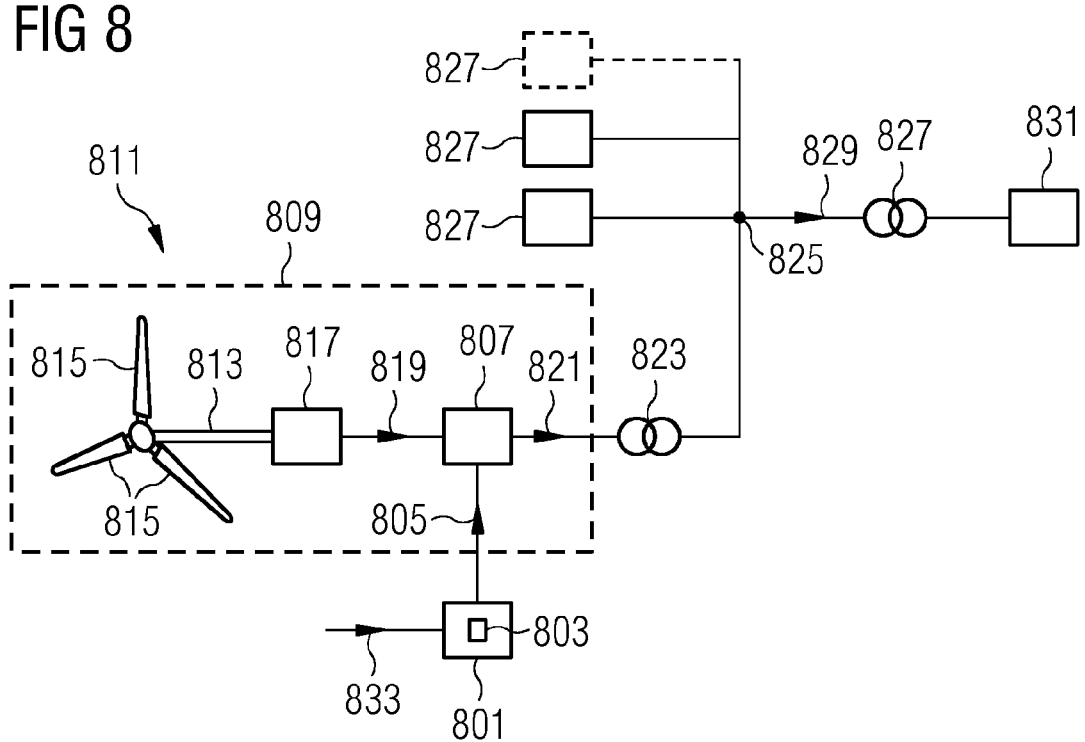
FIG. 8 schematically illustrates an arrangement for controlling a wind turbine together with the controlled wind turbine according to an embodiment of the present invention.

FIG. 8 schematically illustrates an arrangement 801 for controlling a wind turbine 811 according to an embodiment of the present invention together with an exemplary wind turbine 811 and exemplary further wind turbines 827 which are connected to a utility grid 831.

The arrangement 801 comprises a processor 803 for generating a control signal 805 for transmission to a converter 807 or another component of a drive train 809 of the wind turbine 811. Thereby, the control signal 805 is generated for increasing a rotational speed of the rotor 813 from a nominal rotational speed to an increased rotational speed. Thereby, the rotor 813 has one or more rotor blades 815 connected to it and is mechanically coupled to a generator 817 which provides a variable frequency power stream 819 to the converter 807 which converts the power stream to a fixed frequency power stream 821 which is supplied to a wind turbine transformer 823 and from there to a point of common coupling 825 to which the wind turbine 811 and plural other wind turbines 827 are connected. Via a station transformer 827, the combined power stream 829 is provided to the utility grid 831.

The arrangement 801 may be adapted to carry out a control method according to an embodiment of the present invention. According to an exemplary embodiment, the arrangement 801 receives information 833 to decrease power output upon which receipt of the information the control signal 805 may be generated. Later on in a control method according to an embodiment of the present invention, the arrangement 801 may receive another information 833 indicating that power output should be increased. Thereupon, another control signal 805 may be transmitted to the converter 807 to cause the converter 807 to extract kinetic energy stored within the rotor 813 in order to provide the kinetic energy after conversion into electrical energy to the utility grid 831.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for controlling a wind turbine having a rotor and being connected to an electrical utility grid, the method comprising:
    receiving an indication of a first level of a power demand from the utility grid;
    operating the wind turbine within a first range of wind speeds at a first speed of rotor rotation and a first angle of a blade pitch that generates a first level of a power output that matches the first level of the power demand;
    receiving an indication from the utility grid of a decreased power demand that is less than the first level of power demand;
    reducing the power output to a second level that matches the decreased power demand by reducing a generator torque on the rotor while maintaining the first blade pitch angle within ±10%, thereby causing the rotor rotation to increase to a second rotation speed;
    maintaining a blade tip to wind speed ratio that is higher than optimum for a maximum coefficient of power until an increase in the power output is required;
    receiving an indication of an increased power demand from the utility grid that is greater than the decreased power demand; and increasing the power output to a third level that matches the increased power demand by increasing the generator torque on the rotor while holding the blade pitch within ±10% of the first blade pitch angle, causing the rotor rotation to decrease to a third rotation speed and extracting a kinetic energy of rotation from the rotor.

2. The method according to claim 1, wherein the third rotation speed is below the first speed of the rotor rotation.

3. The method according to claim 1, further comprising:
in a second range of wind speeds between zero and the first range of wind speeds, maintaining a greater blade tip to wind speed ratio than an optimum blade tip to wind speed ratio that would otherwise produce a peak coefficient of power by controlling the generator torque to produce a higher than optimum rotor rotation speed at each wind speed in the second range of wind speeds, thereby storing a margin of rotational kinetic energy in the rotor.

* * * * *